(12) United States Patent
Adachi et al.

(10) Patent No.: US 7,828,320 B2
(45) Date of Patent: Nov. 9, 2010

(54) KNEE PROTECTING AIRBAG DEVICE (75) Inventors: Yuichi Adachi, Aichi-ken (JP); Kazuaki Bito, Aichi-ken (JP); Osamu Fukawatase, Aichi-ken (JP); Tomoyuki Moro, Toyota (JP); Kenji Imamura, Kosai (JP); Akiyoshi Sanada, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 33 days.

(21) Appl. No.: 12/311,779

(22) PCT Filed: Oct. 26, 2007

(86) PCT No.: PCT/JP2007/071358

§ 371 (c)(1),
(2), (4) Date: May 22, 2009

(87) PCT Pub. No.: WO2008/053981

PCT Pub. Date: May 8, 2008

(65) Prior Publication Data

US 2009/0322063 A1 Dec. 31, 2009

(30) Foreign Application Priority Data

Oct. 31, 2006 (JP) ............................. 2006-295823

(51) Int. Cl.
*B60R 21/16* (2006.01)
(52) U.S. Cl. .................................................. 280/730.1
(58) Field of Classification Search ............. 280/730.1, 280/752
See application file for complete search history.

(56) References Cited

U.S. PATENT DOCUMENTS

| 5,570,901 | A | 11/1996 | Fyrainer |
| 6,938,919 | B2 | 9/2005 | Abe |
| 2008/0217888 | A1* | 9/2008 | Fukawatase et al. ...... 280/730.1 |

FOREIGN PATENT DOCUMENTS

DE 20 2006 001 826 U1 6/2006
EP 1 300 300 A1 4/2003

(Continued)

OTHER PUBLICATIONS

Dec. 8, 2009 Office Action issued in Japanese Patent Application No. 2006-295823 (w/ translation).

*Primary Examiner*—Faye M. Fleming
(74) *Attorney, Agent, or Firm*—Oliff & Berridge, PLC (57) ABSTRACT

In a knee protecting airbag device of the present invention, in the lower area inside a column cover, a case housing an airbag is attached to a steering column. The steering column includes a movable member for moving toward the front side of a vehicle along the axial direction of the column at the time when an impact on the front of the vehicle acts, and an unmoving stationary member, so that the column can absorb the impact when the movable member moves. The case is attached to such an area of the movable member that the case hits the stationary member when the moving member moves and absorbs impact, and the case can be deformed before or at the time of hitting the stationary member so that the moving stroke of the movable member is preserved when it moves.

6 Claims, 11 Drawing Sheets

FOREIGN PATENT DOCUMENTS

| | | |
|---|---|---|
| JP | A-8-301054 | 11/1996 |
| JP | A-9-104317 | 4/1997 |
| JP | A-10-71911 | 3/1998 |
| JP | A-2001-106013 | 4/2001 |
| JP | A-2001-347914 | 12/2001 |
| JP | A-2002-37003 | 2/2002 |
| JP | A-2003-40072 | 2/2003 |
| JP | A-2003-118530 | 4/2003 |
| JP | A-2004-98892 | 4/2004 |

* cited by examiner

KNEE PROTECTING AIRBAG DEVICE

TECHNICAL FIELD

The present invention relates to a knee protecting airbag device constituted by housing a folded airbag in a case which is arranged in a lower area inside a column cover to cover a steering column and which is attached to the steering column.

BACKGROUND ART

In a knee protecting airbag device of the prior art as disclosed in JP-A-2002-37003, which is constituted by housing a folded airbag in a case to be attached to a steering column, the case is attached to a column tube of the steering column. In this knee protecting airbag device of the prior art, the case is made of a sheet metal and attached to the column tube.

Moreover, a steering column of the prior art is constituted such that a main shaft is moved toward the front side of a vehicle along the axial direction and deforms an impact energy absorbing member when an impact acts in the forward direction, thereby absorbing the impact (or the impact energy). In case the knee protecting airbag device of the prior art is constituted such that it is attached to the main shaft of the steering column, as described above, the knee protecting airbag device moves together with the main shaft. In this case, moreover, the case made of a sheet metal which is moved may hit a member attached to a column cover which is arranged around the main shaft but does not move even at the moving time of the main shaft.

DISCLOSURE OF THE INVENTION

An object of the invention is to provide a knee protecting airbag device, which is constituted not to obstruct the movement of a steering column when absorbing impact even if it is attached to the steering column.

The object of the invention can be achieved by a knee protecting airbag device having the following constitution.

A knee protecting airbag device comprising: a case which is arranged at a lower area inside a column cover to cover a steering column and which is attached to the steering column; an airbag folded and housed in the case; and an inflator for feeding an inflating gas to the airbag, wherein as the airbag is inflated to expand while admitting the inflating gas discharged from the inflator, it protrudes from the column cover, thereby to protect the knees of a seated driver, wherein the steering column includes a movable member for moving toward the forward of the vehicle along the axial direction when an impact acts toward the forward direction, and an unmoving stationary member, so that the column can absorb an impact when the movable member moves wherein the case is attached to such an area of the movable member that the case hits the stationary member when impact is absorbed, and can be so deformed before or at the time of hitting the stationary member so that the moving stroke of the movable member is preserved when it moves.

In the knee protecting airbag device of the invention, the case is attached to such an area of the movable member that the case hits the stationary member when impact is being absorbed and the case moves, but the case is made deformable. Therefore, when the steering column moves the movable member to absorb the impact, the case which moves according to the movement of the movable member is so deformed before or at the time that it hits the stationary member in a way that the moving stroke of the movable member is preserved. As a result, the resistance when the case hits the stationary member can be reduced so that the impact can be absorbed by the steering column without obstructing the movements of the movable member and the main shaft.

Therefore, even if the knee protecting airbag device of the invention is attached to the steering column, the knee protecting airbag device is constituted not to obstruct the movement of the steering column at the time when the steering column absorbs the impact.

In the knee protecting airbag device of the invention, moreover, it is preferred that the case is made so deformable that its front side may be recessed obliquely downward in the protruding direction of the airbag from the column cover. With this constitution, the stroke which deforms the case can be minimized by aligning that stroke with the direction in which the case hits the stationary member. Therefore, the extent of deformation of the case can be efficiently suppressed to retain the moving stroke of the movable member.

In the knee protecting airbag device of the invention, moreover, it is preferred that the inflator is so housed together with the airbag in the case, arranged on the rear side of the folded airbag. Specifically, in the knee protecting airbag device of the aforementioned constitution, the inflator is housed on the rear side of the case outside of the area of the case which will be deformed. When the case is deformed, therefore, the inflator can be prevented from being hit by the stationary member indirectly through the deformed case. As a result, it is possible to move the movable member and the main shaft smoothly.

In the knee protecting airbag device of the invention, moreover, it is preferred that the case is constituted by connecting its to-be-deformed portion to the airbag so that the to-be-deformed portion may be deformed by the expansion and inflation of the airbag. In this constitution, the case is deformed along with the expansion and inflation of the airbag before the movable member moves and the case hits the stationary member. Therefore, the case can be prevented as much as possible from contacting directly with the stationary member. As a result, the movable member and the main shaft can be smoothly moved and the impact is more reliably absorbed by the steering column.

Specifically in the knee protecting airbag device of the invention, it is preferred that the case is constituted of a sheet member made of a material having flexibility but not elongation, so that it can catch (stop) the reaction of the airbag when it expands outward. In case the case is constituted of such sheet member, it is preferred that the sheet member is formed into a rectangular plate shape and arranged such that its two front and rear edges are connected to the vicinities of the front and rear edges of a projection opening of the airbag in the column cover. In the knee protecting airbag device thus constituted, the case can receive the reaction toward the case which is generated at the time of the expansion and inflation of the airbag, so that the airbag can inflate smoothly to protrude downward from the projection opening. In the constitution of the case thus far described, moreover, the sheet member is arranged so that it can be bent in the longitudinal direction (front-rear direction), with the front and rear edges connected to the vicinities of the front and rear edges of the projection opening. Therefore, it is possible to latch on the projection opening in the transverse direction of the column cover and also to deform the case easily.

BEST MODE FOR CARRYING OUT THE INVENTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 8:
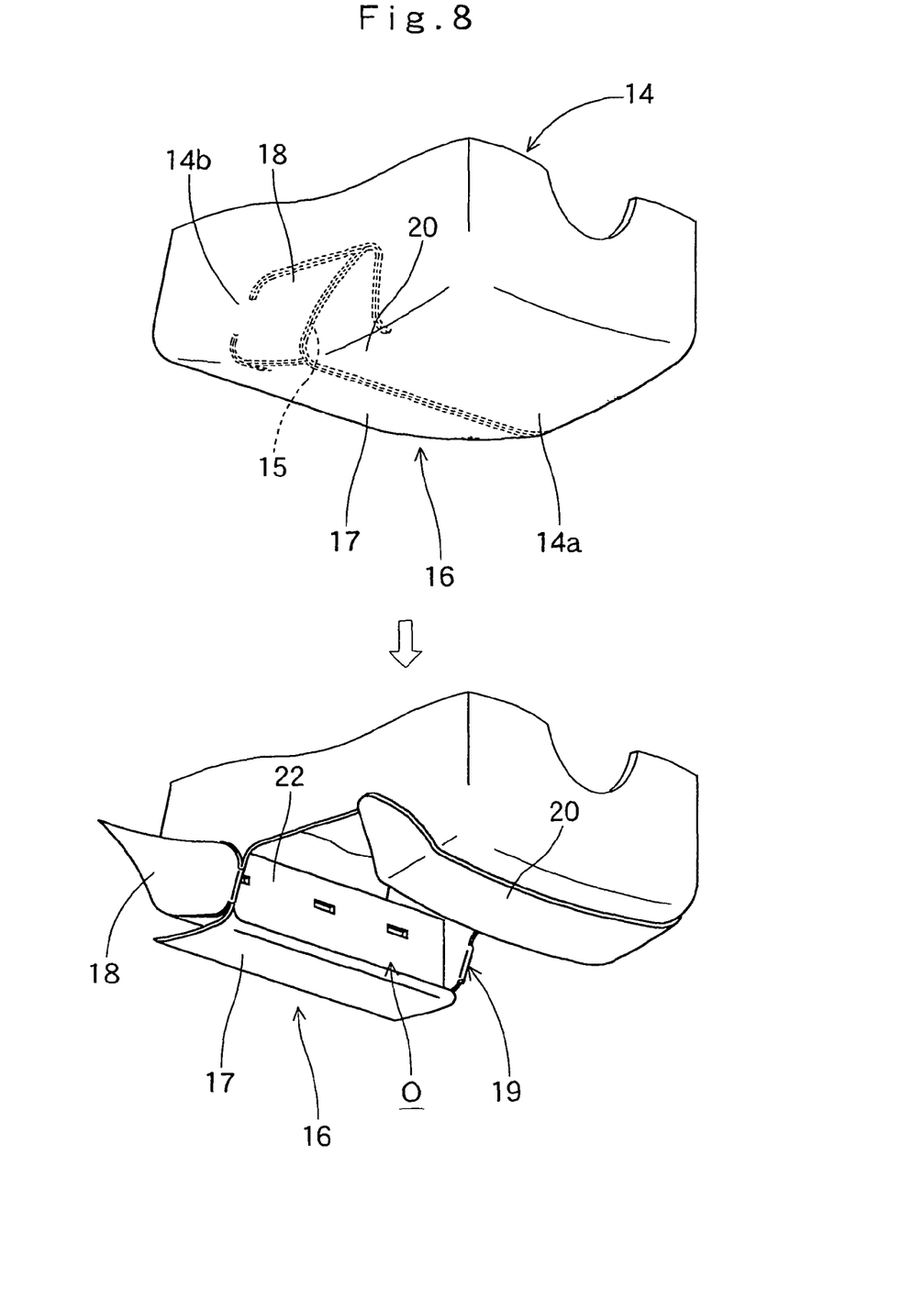
FIG. 8 is a schematic partial perspective view showing the states of a front door portion and a rear door portion which are formed in the column cover to be employed in the knee protecting airbag device of the embodiment, before and after they are opened.

One embodiment of the invention is described here, referring to the accompanying drawings. The knee protecting airbag device M of the embodiment is arranged, as shown in FIGS. 1 to 5, on the lower area inside a column cover 14 covering a steering column 3 of a steering wheel 1. This knee protecting airbag device M is provided with a case 37 attached to the steering column 3, an airbag 26 folded and housed in the case 37, and an inflator 32 for feeding an inflating gas to the airbag 26. In the knee protecting airbag device M, moreover, the airbag 26 projects out, when inflated, from a projection opening O (as referred to FIG. 8 and FIG. 10) formed as the airbag pushes and opens a front door portion 16 and a rear door portion 20 formed in the column cover 14, so that it is arranged on the front side of the two knees K (KL and KR) of a seated driver MD.

Figure 1:
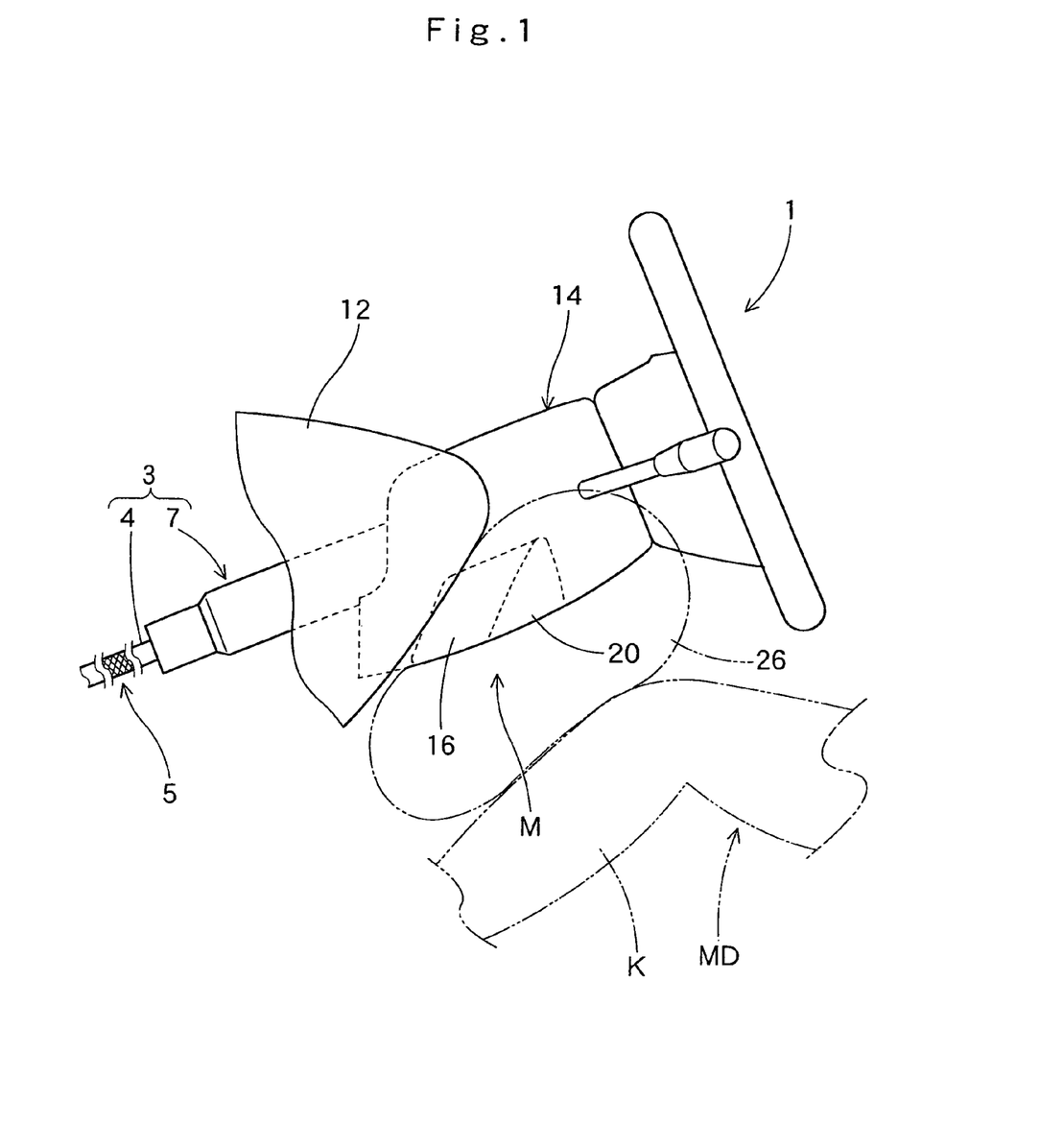
FIG. 1 is a schematic side elevation showing the vicinity of a steering column, to which a knee protecting airbag device according to one embodiment of the invention is mounted.

In the embodiment, the steering column 3 is provided, as shown in FIG. 1, with a main shaft 4, and a column tube 7 enclosing the main shaft 4. The column tube 7 is constituted to include an inner member 8 and an outer member 9 (see FIG. 3). The inner member 8 is formed into a cylindrical shape and arranged closer to the main shaft 4 as the inner circumference. The outer member 9 is arranged outside the inner member 8. In the steering column 3 of the embodiment, moreover, an impact absorbing mechanism 5 is arranged, as shown in FIG. 1. This impact absorbing mechanism 5 is constituted such that it is deformed when there is an impact impelling the steering wheel 1 toward the forward of vehicle, thereby moving the steering wheel 1 to the forward of the vehicle along the axial direction of the main shaft 4. Specifically, this impact absorbing mechanism 5 is deformed to absorb the impact energy moving the steering wheel 1 to the forward of the vehicle along the axial direction of the main shaft 4 when the driver MD moves forward to hit the steering wheel 1, thereby relaxing the impact on the driver MD. In the case of the embodiment, moreover, the inner member 8 of the column tube 7 is constituted as a movable member to move together with the steering wheel 1 (or the main shaft 4) to the forward of the vehicle along the axial direction, when the impact absorbing mechanism 5 is deformed. Moreover, the outer member 9 of the column tube 7 is constituted as a stationary member not to move even when the impact absorbing mechanism 5 is deformed. The knee protecting airbag device M of the embodiment is constituted with a case 37 attached to the inner member 8 in the column tube 7. On the front side of the knee protecting airbag device M, an adjusting mechanism 10 constituting a stationary member such as a tilting mechanism or a telescopic mechanism is provided so as to be attached to the outer member 9. In the case of the embodiment, moreover, the case 37 of the knee protecting airbag device M is installed on the inner member 8 at an area where it will hit the adjusting mechanism 10 attached to the outer member 9, when the steering wheel 1 moves and impact is absorbed.

Figure 7:
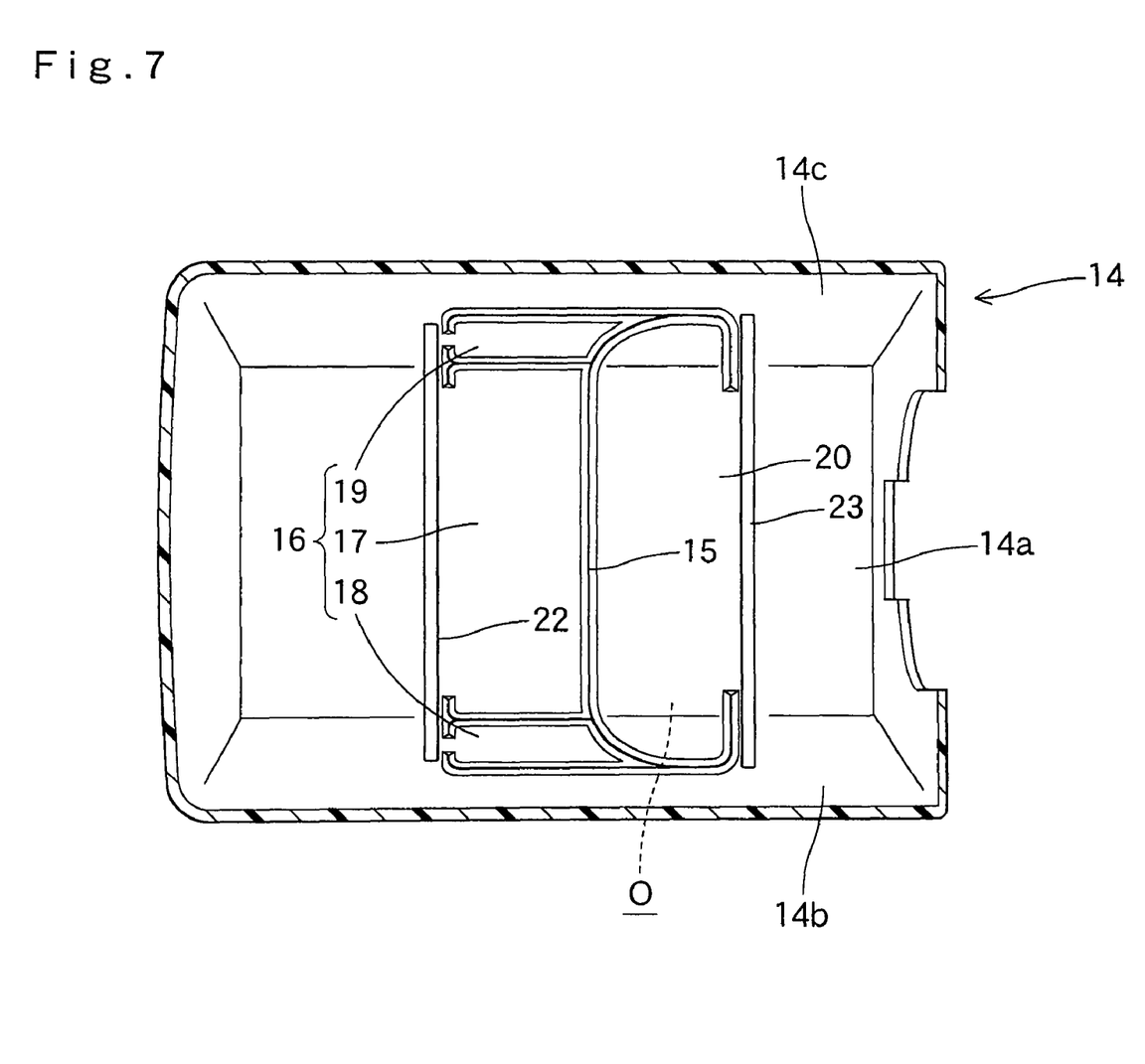
FIG. 7 is a schematic transverse section of a column cover to be employed in the knee protecting airbag device of the embodiment.

The column cover 14 is formed of a synthetic resin into a substantially square tube shape to cover the steering column 3. The column cover 14 is attached to a not-shown portion of the column tube 7 of the steering column 3. The rear (lower) face 14a of the column cover 14 which protrudes from an instrument panel (hereafter abbreviated to "panel") 12 around the column cover 14, is formed into a substantially rectangular plate shape curving up as it extends rearward in the vehicular longitudinal direction (front-rear direction). As shown in FIG. 7, the front door portion 16 and the rear door portion 20, which can be opened to form the projection opening O when the airbag 26 is inflated to expand, are formed in the area of the column cover 14 extending from the side of the lower face 14a to a left face 14b and a right face 14c. Around the front door portion 16 and the rear door portion 20, there is arranged a breakable portion 15 which can be broken by the push of the airbag 26. The front door portion 16 is constituted with the breakable portion 15 therearound so that its rear edge may be opened out toward the front. The front door portion 16 is divided into three portions, a lower door portion 17, a left door portion 18 and a right door portion 19. The lower door portion 17 is provided in the lower face 14a of the column cover 14. The left door portion 18 is provided in the left face 14b of the column cover 14. The right door portion 19 is provided in the right face 14c of the column cover 14. The rear door portion 20 is so constituted that its front edge is opened toward the rear. The rear door portion 20 is arranged to the rear of the front door portion 16 in the area extending from the lower face 14a to the left face 14b and the right face 14c of the column cover 14.

Figure 3:
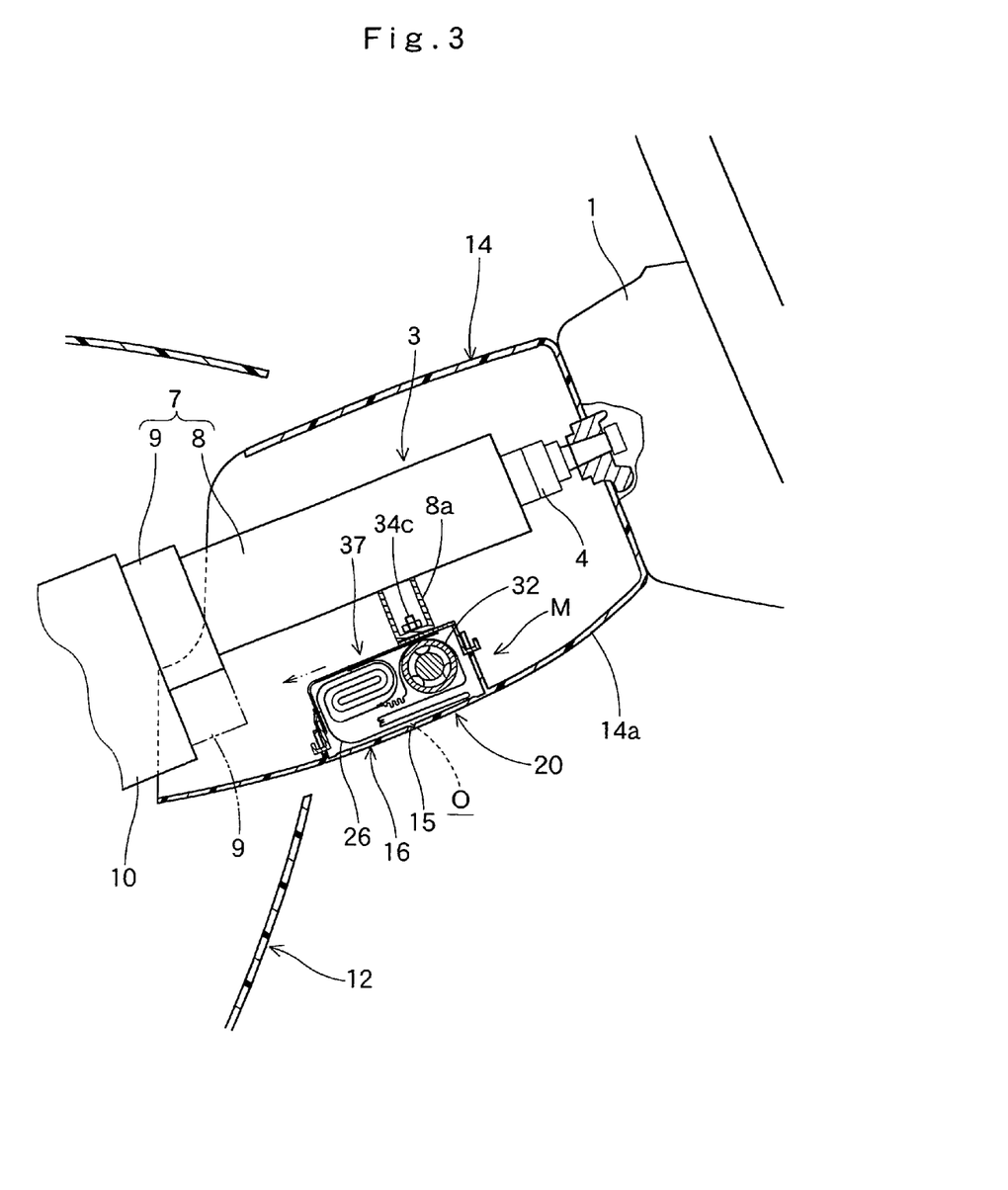
FIG. 3 is a schematic longitudinal section showing the mounted state of the knee protecting airbag device of the embodiment in the vehicular longitudinal direction.
Figure 4:
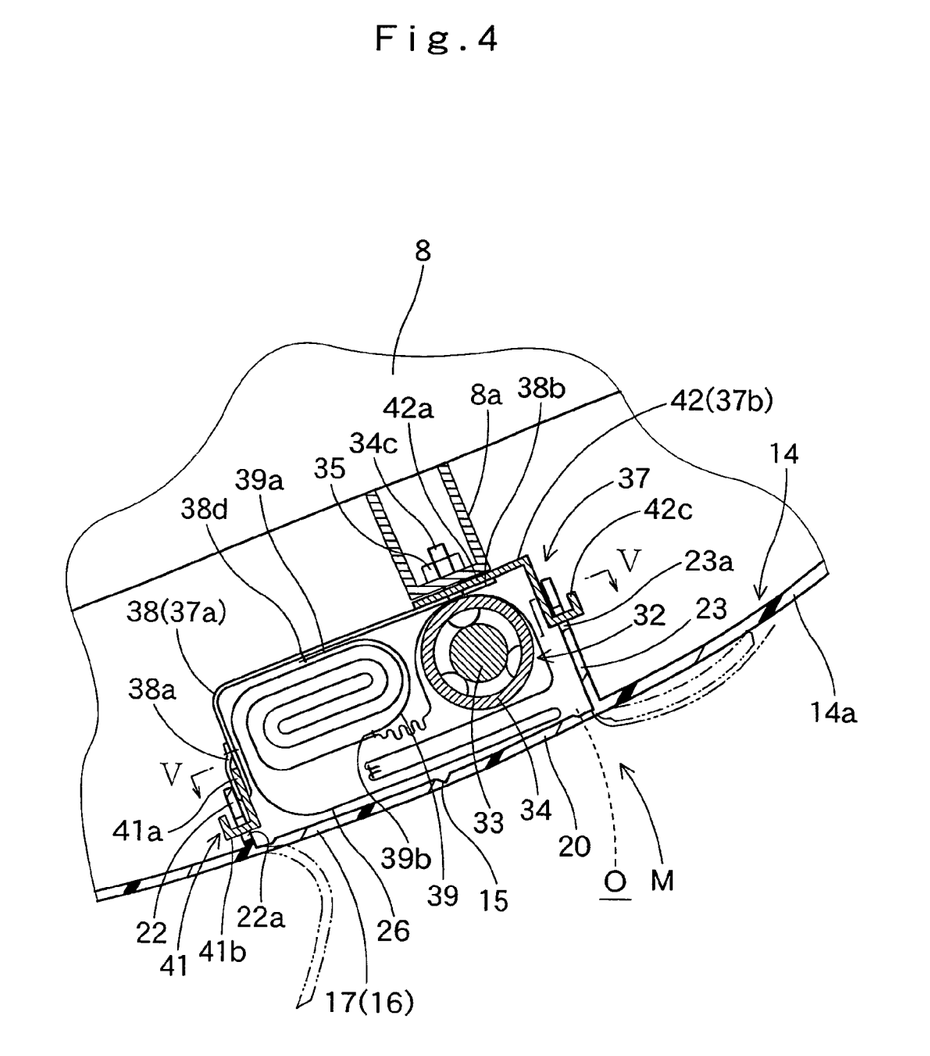
FIG. 4 is a schematically enlarged longitudinal section of the knee protecting airbag device in the vehicular longitudinal direction.

On the front edge of the front door portion 16 and on the rear edge of the rear door portion 20 of the column cover 14, moreover, there are arranged wall portions 22 and 23 (as seen in FIGS. 3 and 4), respectively, which are attached to the case 37. The individual attached wall portions 22 and 23 are arranged to extend transversely to the column cover and to protrude inward from the circumference of the column cover. The attached wall portions 22 and 23 are each provided with plural retaining holes 22a and 23a, respectively, in the transverse direction (left-right direction) of the vehicle. These retaining holes 22a and 23a are adapted to latch on the later-described retaining pawls 41b and 42c of the case 37 on the rims of these holes.

Figure 2:
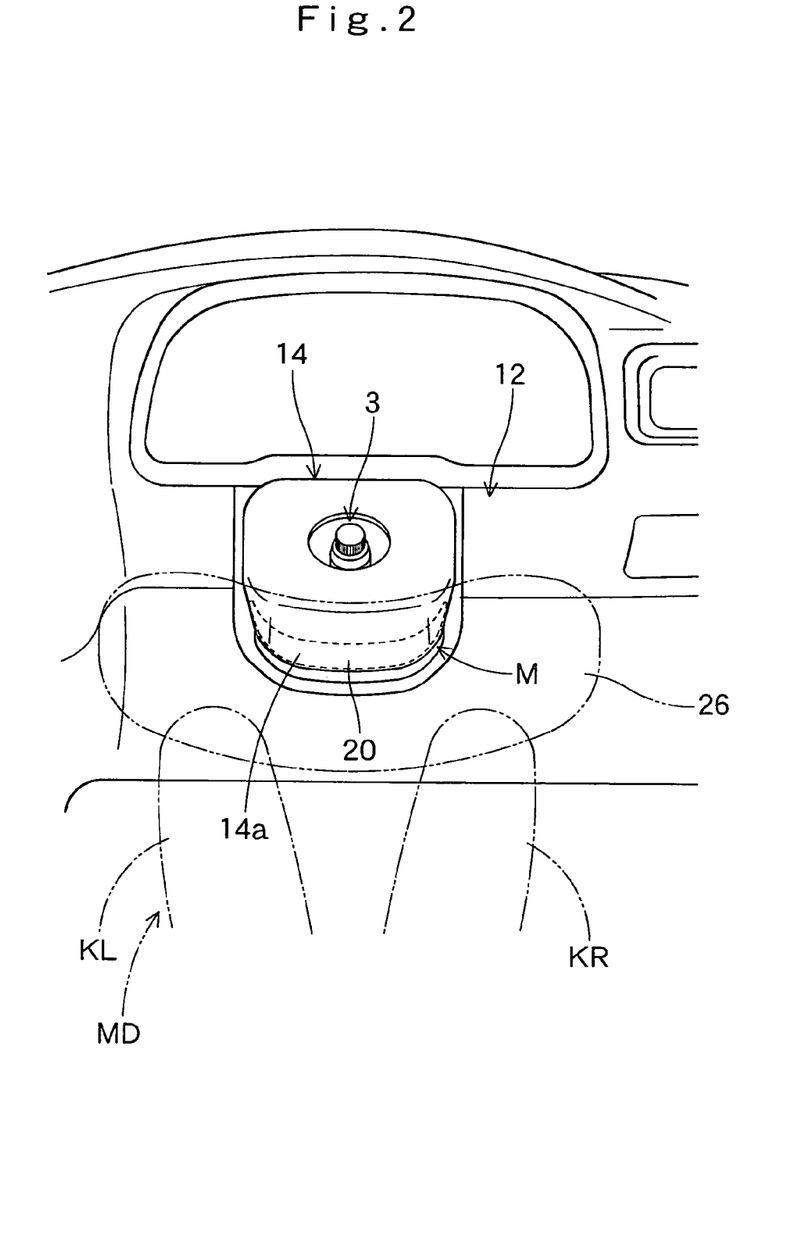
FIG. 2 is a schematic front elevation showing the mounted state of the knee protecting airbag device of the embodiment, taken from the rear of a vehicle.
Figure 6:
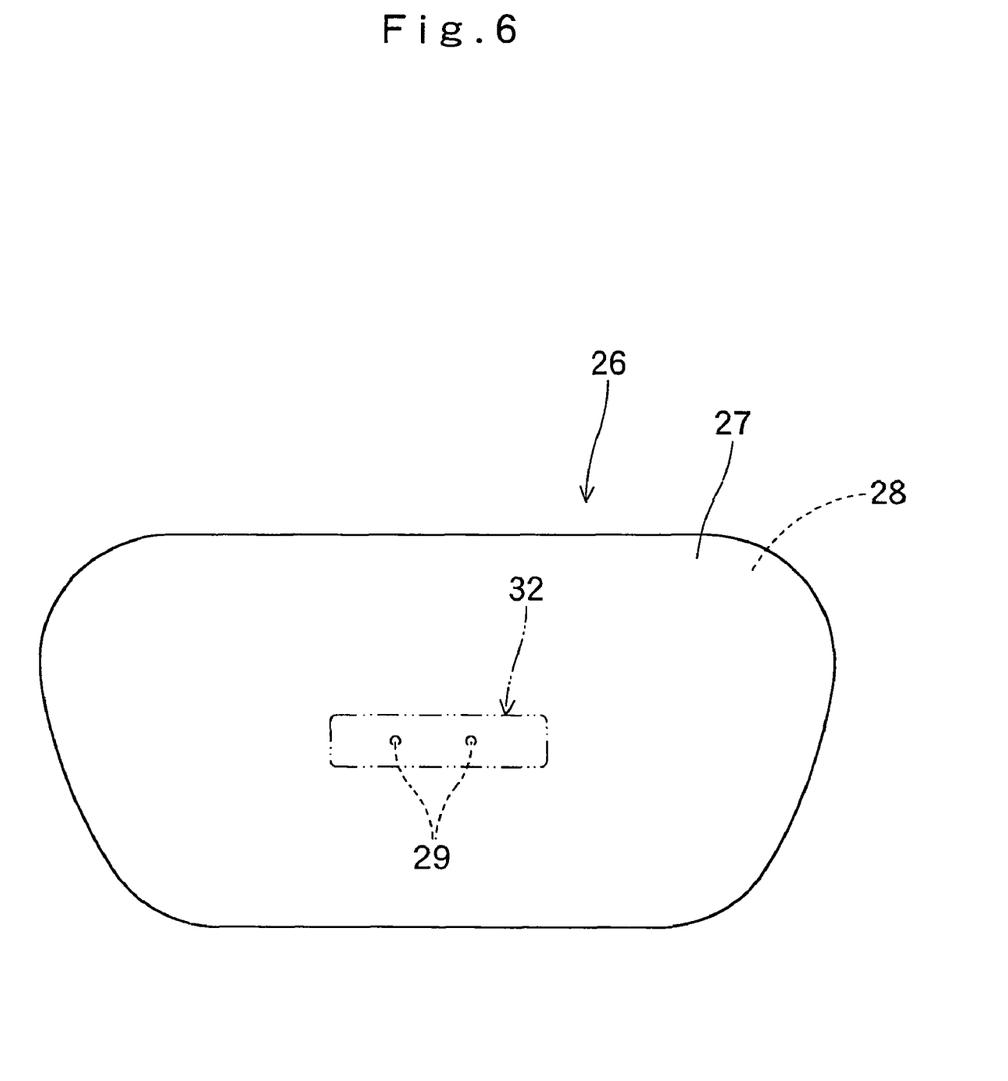
FIG. 6 is a schematic front elevation of an airbag to be employed in the knee protecting airbag device of the embodiment.
Figure 10:
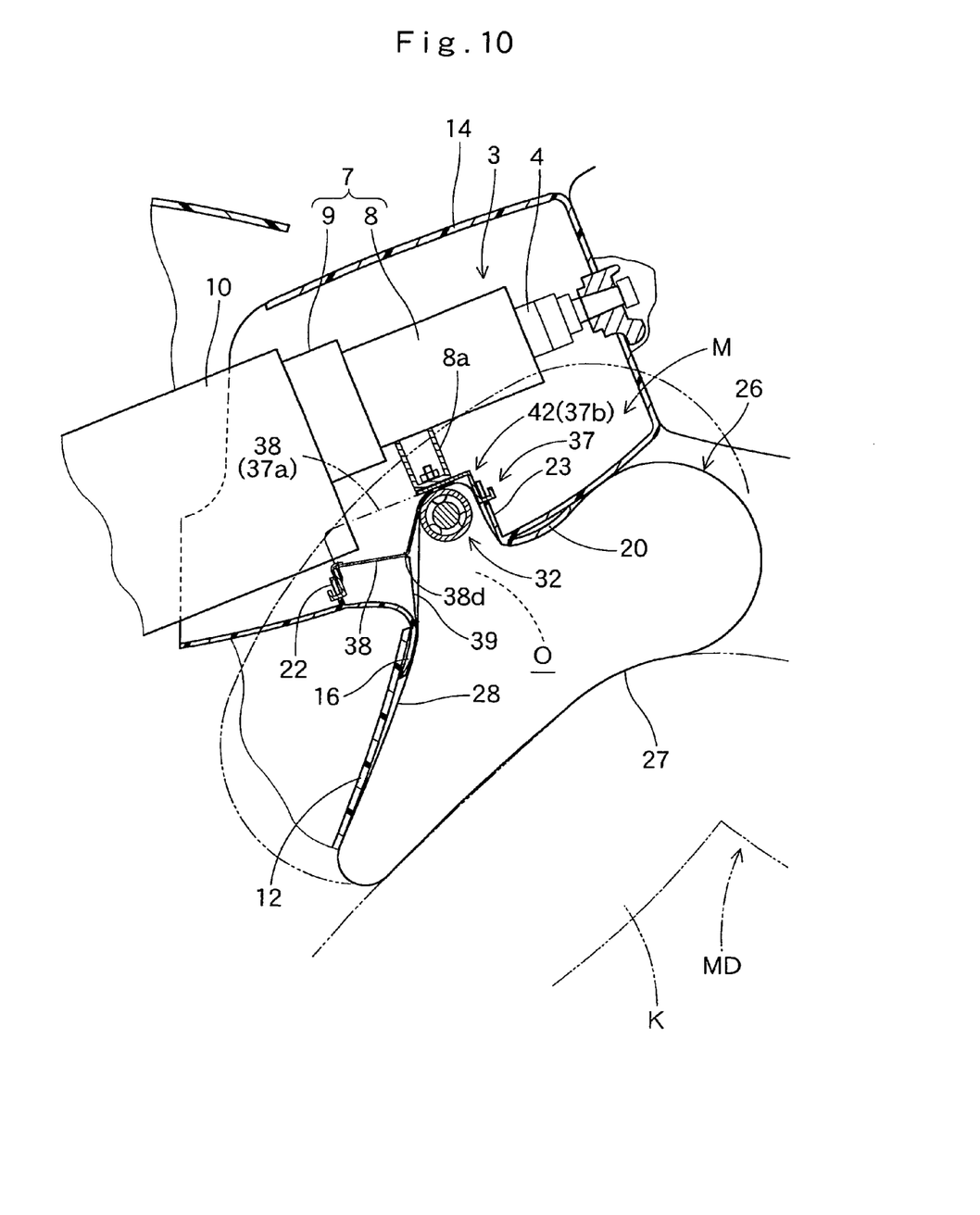
FIG. 10 is a schematic sectional view in the vehicular longitudinal direction showing the expansion-completed state of the airbag in the knee protecting airbag device of the embodiment.

The airbag 26 is formed, when its inflation is completed, into a plate shape extended in the transverse direction of the vehicle, as shown by double-dotted lines in FIGS. 1 and 2 and in FIGS. 6 and 10. The airbag 26 is provided with a driver-side wall portion 27 which faces the driver MD, and a column-side wall portion 28 to be arranged facing the column cover 14. The driver-side wall portion 27 and column-side wall portion 28 are so cut from woven fabric of polyester or polyamide yarns as to have an identical contour. Moreover, the airbag 26 of the embodiment is formed by sewing the outer peripheral edges of the driver-side wall portion 27 and the column-side wall portion 28 to each other. Moreover, attaching holes 29 are formed at a plurality of portions of the column-side wall 28 (e.g., two in the embodiment; see FIG. 6). The attaching holes 29 are formed so as to allow bolts 34c (as referred to FIGS. 3 and 4) of the inflator 32 housed in the airbag 26 to protrude through the holes. Moreover, the airbag 26 is so constituted as to cover the lower face 14a of the column cover 14 protruding to the rear from the panel 12 and the rear side of the panel 12 below and to the left and right of the column cover 14 by the knees KL and KR of the driver MD, when expansion of the airbag 26 is completed.

Figure 5:
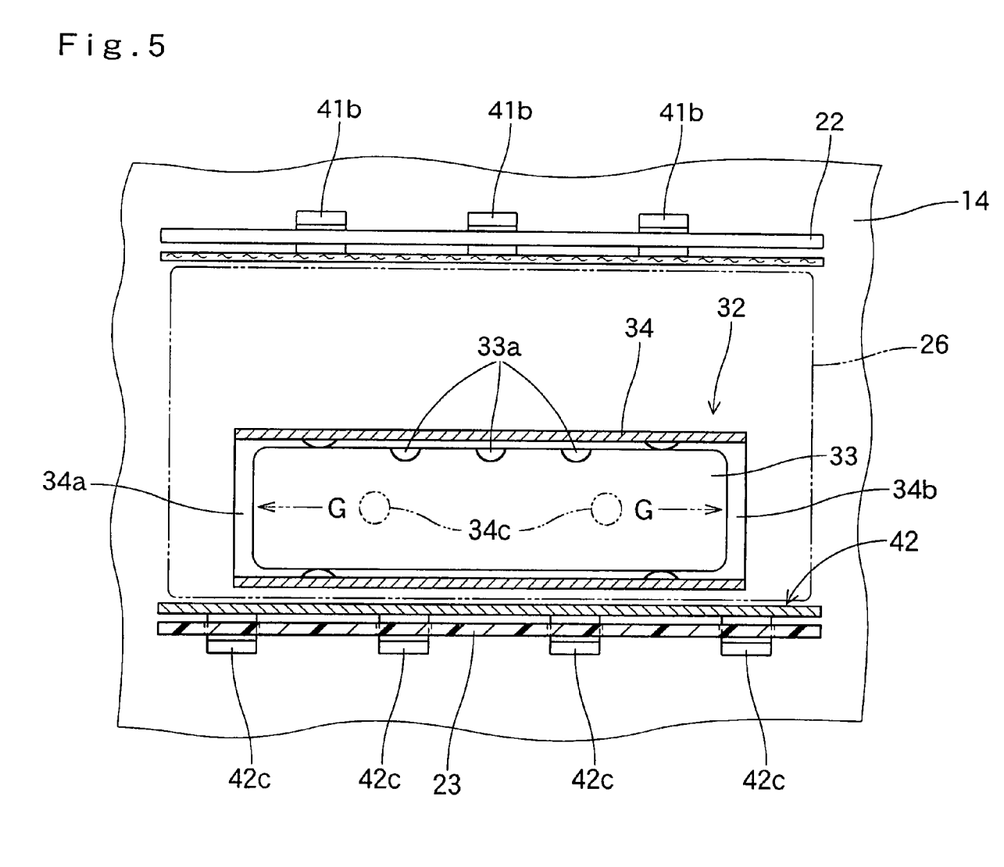
FIG. 5 is a schematically enlarged section of a portion V-V of FIG. 4.

The inflator 32 is constituted, as shown in FIGS. 3 to 5, to include a cylinder type body 33 and a substantially cylindrical diffuser 34 for holding the body 33. The body 33 is arranged to have its axis pointing transversely. In the case of the embodiment, moreover, the body 33 is provided with a plurality of gas discharge ports 33a. The gas discharge ports 33a are arranged transverse to the axis near the central portion along the axis and made to face toward the front at the time the inflator 32 is mounted on the vehicle. Moreover, the not-shown lead lines are connected with the body 33. The diffuser 34 is constituted so as to have its two transverse ends opened and to cover all over the body 33. The diffuser 34 is also constituted to discharge inflating gas G from openings 34a and 34b on its two transverse ends. The diffuser 34 is constituted to hold the body 33 by caulking at a plurality of locations around the axis, as shown in FIGS. 3 to 5. Moreover, the diffuser 34 is provided with the two bolts 34c. These bolts 34c attach the inflator 32 to the airbag 26 and also the case 37 to the inner member 8 of the column tube 7. Each bolt 34c is fastened by a nut 35 to a bracket 8a formed on the inner member 8, as shown in FIGS. 3 and 4. In the case of the embodiment, moreover, the inflator 32 is housed together with the airbag 26 in the case 37, to the rear of the folded airbag 26.

The case 37 is arranged to cover the folded airbag 26 and the inflator 32, extending from their front to their top and to their rear. The case 37 is constituted to include a main body 38 made of a flexible sheet member of a rectangular plate shape, and attaching brackets 41 and 42 of a sheet metal arranged on the two front and rear edges of the main body 38. The attaching brackets 41 and 42 are portions for attaching to the wall portions 22 and 23 of the column cover 14, respectively.

Figure 9:
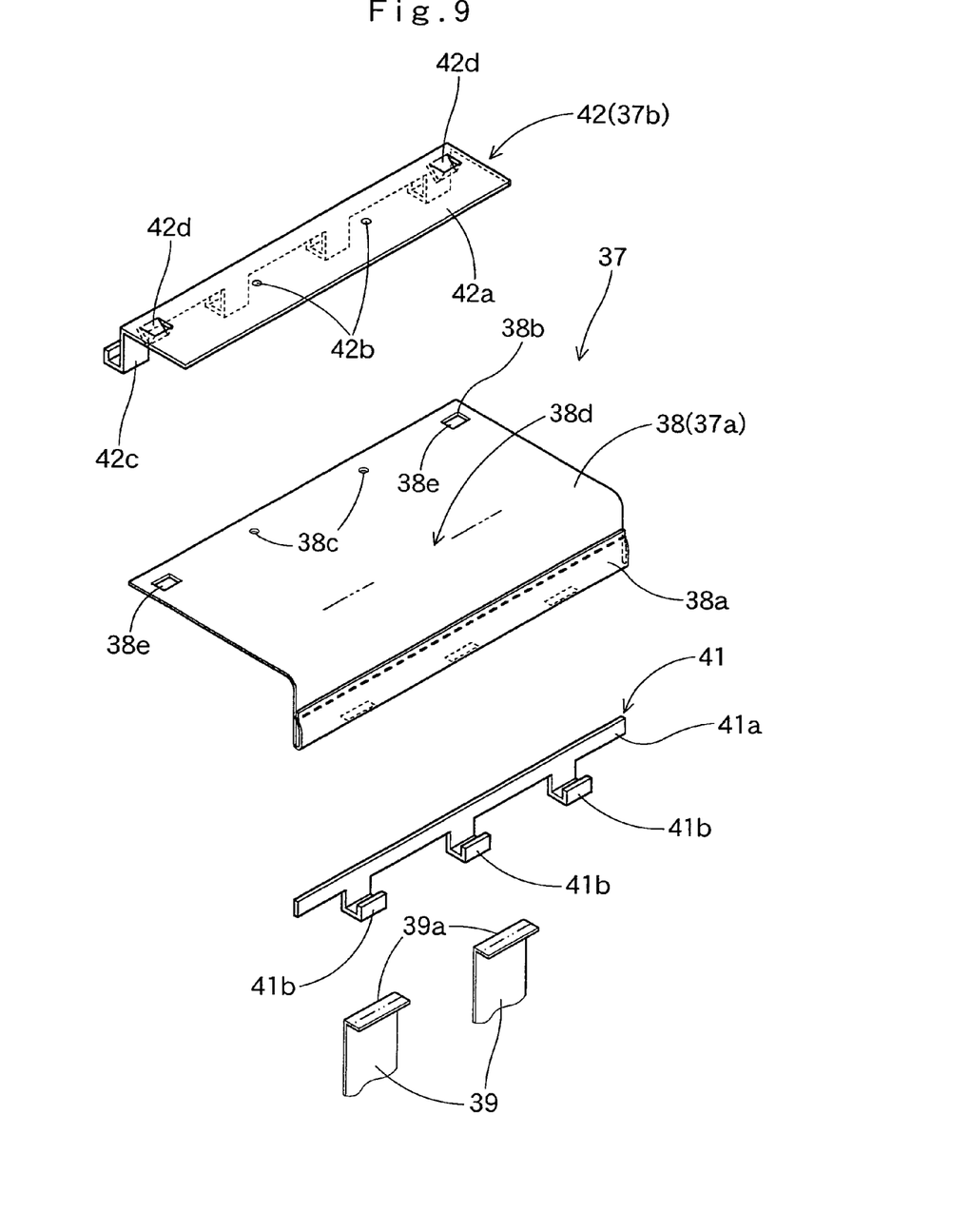
FIG. 9 is a schematically exploded perspective view of a case to be employed in the knee protecting airbag device of the embodiment.

The main body 38 contains an airbag housing portion 37a on the front side of the case 37, toward the adjusting mechanism 10. In the case of the embodiment, the body 38 is made of a woven fabric of poorly extensible polyester or polyamide yarns, so that the body 38 can catch (stop) the reaction of the expanding airbag 26. The front edge portion 38a of the main body 38 wraps around and connects with the later-described strip member 41a of the attaching bracket 41 arranged on the front side. In the rear edge portion 38b of the main body 38, moreover, there are formed through holes 38c and through holes 38e (see FIG. 9). In the through holes 38c are inserted the bolts 34c of the inflator 32. The through holes 38e latch on retaining protrusions 42d formed on the later-described attaching base portion 42a of the attaching bracket 42. The rear edge portion 38b of the main body 38 is interposed between the later-described attaching base portion 42a of the attaching bracket 42 and the airbag 26. Thus, the main body 38 is attached, together with the attaching base portion 42a and the airbag 26, to the bracket 8a formed on the inner member 8 by the bolts 34c of the inflator 32.

At two positions near the longitudinal central portion of the body 38 to the vehicular right and left are provided two band-shaped straps 39 which are connected to the airbag 26. These straps 39 are sewn on at their lower end portions 39a to the main body 38 and their leading ends 39b are sewn to the airbag 26 to be folded and housed. Moreover, the portion of the main body 38 sewn with the lower end portions 39a of the straps 39 is to-be-deformed portion 38d. The leading ends 39b of these straps 39 are sewn to portions of the airbag 26 to the forward of the attaching holes 29 of the column-side wall portion 28. Moreover, these straps 39 takes such a mode, as the airbag 26 expands, as to pull down the to-be-deformed portion 38d of the body 38, to which the lower end portions 39a are sewn. Thus, the main body 38 is pulled down at the to-be-deformed portion 38d when the airbag 26 is inflated to expand. Specifically, the main body 38 is so deformed by the pull of the straps 39 that it is entirely recessed around the to-be-deformed portion 38d obliquely downward in the protruding direction of the airbag 26 from the column cover 14. Specifically, in the knee protecting airbag device M of the embodiment, the airbag housing portion 37a of the case 37 toward the adjusting mechanism 10 (the stationary member) is deformed in its entirety to be recessed downward.

The attaching bracket 41 arranged on the front side is provided with a strip member 41a and a plurality of retaining pawls 41b. The strip member 41a is arranged transversely on the front side of the airbag 26 housed in the folded shape. The retaining pawls 41b protrude downward from the strip member 41a. Each of the retaining pawls 41b is so constituted to latch on the rim of a retaining hole 22a formed in the attaching wall portion 22 of the column cover 14.

The attaching bracket 42 arranged to the vehicular rear constitutes an inflator housing portion 37b and forms the rear side of the case 37. The attaching bracket 42 is provided with the attaching base portion 42a having a substantially L-shaped cross-section, and a plurality of retaining pawls 42c protruding downward from the attaching base portion 42a. The attaching base portion 42a is arranged to cover the upper side and the rear side of the inflator 32. The attaching base portion 42a has attaching holes 42b in which the bolts 34c of the inflator 32 are inserted. Moreover, retaining protrusions 42d protruding downward are formed (see FIG. 9) near the two left and right ends of the attaching base portion 42a which are spaced away from the position of the inflator 32. The retaining protrusions 42d are the portions which are latched on the rims of the through holes 38e formed in the main body 38 as to prevent the main body 38 from coming out. The individual retaining pawls 42c are constituted so as to latch on the rims of the retaining holes 23a formed in the attaching wall portion 23 of the column cover 14.

In the knee protecting airbag device M of the embodiment after being mounted on the vehicle, the inflating gas G is discharged from the gas discharge ports 33a of the inflator 32 if an action signal is inputted through the not-shown lead lines to the body 33 of the inflator 32. Then, the inflating gas G flows into the airbag 26 through the openings 34a and 34b on the left and right sides of the diffuser 34. After this, the expanding airbag 26 pushes and opens the front door portion 16 and the rear door portion 20 of the column cover 14. The airbag 26 protrudes downward from the projection opening O thereby to complete its expansion, as shown by the double-dotted lines of FIGS. 1 and 2 and in FIG. 10. Here in the knee protecting airbag device M of the embodiment, the diffuser 34 is opened on its two left and right ends. Therefore, the inflating gas G, as discharged from the inflator 32, flows transversely into the airbag 26. Then, first, the expanding airbag 26 pushes and opens the left door portion 18 and the right door portion 19 of the front door portion 16 and the left and right side portions of the rear door portion 20. After this, the expanding airbag 26 pushes and opens the lower door portion 17 of the front door portion 16 and the lower portion of the rear door portion 20, so that the front door portion 16 and the rear door portion 20 are pushed and opened to the forward and rear respectively, thereby to form the projection opening O. Thus, the airbag 26 protrudes downward from the projection opening O.

In the embodiment, the steering column 3 activates the impact absorbing mechanism 5 when the driver MD hits the steering wheel 1, pushing it forward strongly. Specifically, when the impact absorbing mechanism 5 is activated, it moves the main shaft 4 together with the inner member 8 in the column tube 7 forward to the front of the vehicle along the axial direction, thereby absorbing the impact. Moreover, the knee protecting airbag device M of the embodiment is constituted such that the case 37 for housing the folded airbag 26 is attached to the inner member (movable member) 8 at an area where the case 37 can hit the adjusting mechanism 10 attached to the outer member 9 which is the stationary member in the steering column 3, so that the main body 38 arranged on the front side of the case 37, which constitutes the airbag housing portion 37a, can be deformed. Therefore, when the steering column 3 moves the inner member 8 which is the movable member and the main shaft 4, thereby absorbing the impact, the main body 38 of the case 37 which moves as the inner member 8 moves can be deformed before or at the time it hits the adjusting mechanism 10 so that the moving stroke of the inner member 8 is preserved. As a result, the resistance at the time when the case 37 hits the adjusting mechanism 10 can be reduced so that the impact can be absorbed by the steering column 3 without obstructing the movements of the inner member 8 and the main shaft 4.

Therefore, even if the knee protecting airbag device M of the embodiment is attached to the steering column 3 capable of absorbing the impact, in case the steering column 3 activates the impact absorbing mechanism 5 to absorb the impact, the steering column 3 is not obstructed in its movement at the impact absorbing time so that it can absorb the impact smoothly.

As shown in FIG. 10, moreover, the knee protecting airbag device M of the embodiment is constituted such that the main body 38 constituting the airbag housing portion 37a forming the front side in the case 37 is so recessed obliquely downward, in the direction that the airbag 26 protrudes from the column cover 14. Therefore, the deforming stroke of the case 37 can be minimized because that direction is aligned with the direction in which the adjusting mechanism 10 hits. As a result, the deformation of the case 37 can be efficiently suppressed, thus preserving the moving stroke of the inner member 8 as the movable member.

In the knee protecting airbag device M of the embodiment, moreover, the inflator 32 is housed together with the airbag 26 in the case 37 so as to be arranged to the rear of the folded airbag 26. In other words, in the knee protecting airbag device M of the embodiment, the inflator 32 is housed in the rearward side of the case 37, away from the to-be-deformed area of the case 37. When the case 37 is deformed, therefore, the inflator 32 can be prevented from hitting the adjusting mechanism 10 through the deformed case 37 (or the body 38). As a result, it is possible to move the inner member 8 and the main shaft 4 smoothly.

Still further, the knee protecting airbag device M of the embodiment is constituted such that the to-be-deformed portion 38d in the body 38 of the case 37 can be deformed by utilizing the straps 39 in accordance with the expansion and inflation of the airbag 26. In the embodiment, therefore, before the inner member 8 moves so that the body 38 of the case 37 hits the adjusting mechanism 10, the body 38 of the case 37 can be deformed by the expansion and inflation of the airbag 26. In short, the main body 38 of the case 37 can be prevented as much as possible from directly contacting with the adjusting mechanism 10. As a result, the inner member 8 and main shaft 4 can be smoothly moved so that the impact can be reliably absorbed by the steering column 3.

In the knee protecting airbag device M of the embodiment, in addition, the main body 38 in the case 37 is formed into the sheet member of a rectangular plate shape, which is flexible but does not readily stretch, to as to counter the reaction force of the airbag 26 when it expands. Moreover, the embodiment is constituted such that the front end 38a and the rear end 38b of the main body 38 are connected by the attaching brackets 41 and 42 to those attaching wall portions 22 and 23 in the column cover 14 which are formed near the front and rear edges to form the rim of the projection opening O of the airbag 26. In the knee protecting airbag device M of the embodiment, therefore, the reaction force which is generated at the time of the expansion and inflation of the airbag 26 and directed toward the case 37 can be countered by the main body 28 so that the airbag 26 can be smoothly inflated to project downward from the projection opening O. In the knee protecting airbag device M of the embodiment, moreover, the case 37 is constituted by arranging the main body 38 comprising a sheet member so that it bends in the longitudinal direction, and by connecting the front edge 38a and the rear edge 38b to the vicinity of the front and rear edges of the projection opening O by means of the attaching brackets 41 and 42. As a result, it is possible to retain the projection opening to be formed in the transverse direction of the column cover 14 and to deform the same easily at the deforming time.

Figure 11:
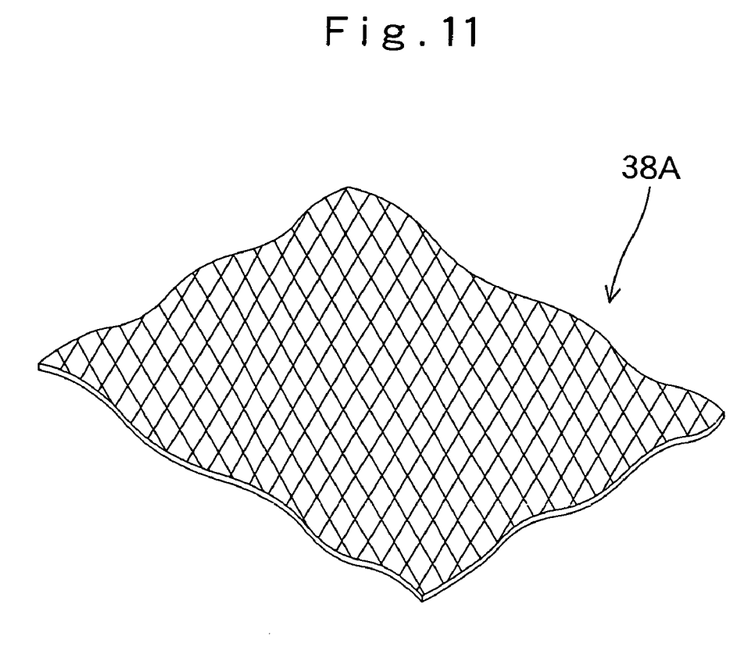
FIG. 11 is a schematic perspective view showing a modification of a seat material.
Figure 12:
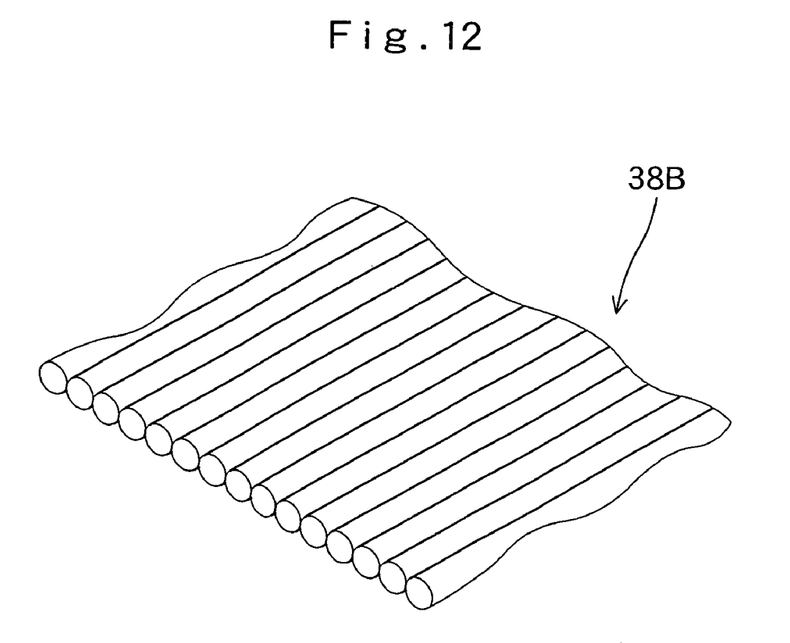
FIG. 12 is a schematic perspective view showing a modification of the seat material.

Here in the embodiment, the main body 38 of the case 37 is formed of woven fabric, but the sheet member forming the case is not especially limited, as long as the sheet member has flexibility and does not readily stretch so that it can counter the reaction force when the airbag expands. For example, the body of the case may be made of a film of a synthetic resin, a metal sheet having a number of holes dispersed to weaken its strength, or a meshed sheet member 38A, as shown in FIG. 11. Moreover, the main body of the case may also be a sheet material 38B formed by juxtaposing a number of transversely aligned long rigid members along the longitudinal direction so that the sheet may warp only in the longitudinal direction.

On the other hand, the steering column 3 is constituted to absorb the impact when the driver MD hits the steering wheel 1. In short, the impact absorbing mechanism 5 is deformed after the airbag 26 protrudes from the case 37. In the embodiment, therefore, the main body 38 is deformed after the airbag 26 protrudes from the case 37. Thus, if the main body 38 hits the adjusting mechanism 10, it can be easily deformed due to the absence of the folded airbag 26. Therefore, the constitution may be modified so that there is no strap in the main body 38 of the case 37.

Here in the embodiment, the adjusting mechanism 10 attached to the outer member 9 which is a stationary portion of the column tube 7 hits the case 37 when the impact is being absorbed by movement of the steering wheel. Of course, the member hitting the case 37 is not limited to the adjusting mechanism 10. As indicated by double-dotted lines in FIG. 3, the outer member 9 itself may be set to have a size capable of hitting the case 37 and be configured so as to hit the case 37.

The invention claimed is:

1. A knee protecting airbag device comprising: a case which is arranged in the lower area inside a column cover which covers a steering column and which is attached to said steering column; an airbag folded and housed in said case; and an inflator for feeding an inflating gas to said airbag,
 wherein said airbag is inflated to expand while admitting the inflating gas discharged from said inflator, the airbag protrudes from said column cover and thus can protect the knees of a seated driver,
 wherein said steering column includes a movable member which moves toward the front side of the vehicle along the axial direction of the steering column at the time when there is an impact on the front of the vehicle, and an unmoving stationary member, and is configured so that the steering column can absorb the impact when said movable member moves, and
 wherein said case is attached to such an area of said movable member that the case hits said stationary member when the steering column moves to absorb the impact, and the case can be deformed before or at the time of hitting said stationary member so as to preserve the moving stroke of said movable member when it moves.

2. A knee protecting airbag device as set forth in claim 1, wherein said case is made deformable so that its front side may be recessed obliquely downward in the direction in which said airbag protrudes from said column cover.

3. A knee protecting airbag device as set forth in claim 1, wherein said inflator is housed together with said airbag in said case to the rear side of the folded airbag.

4. A knee protecting airbag device as set forth in claim 1, wherein said case is constituted by connecting a to-be-deformed portion thereof to said airbag so that said to-be-deformed portion may be deformed by the expansion and inflation of said airbag.

5. A knee protecting airbag device as set forth in claim 1, wherein said case is constituted of a sheet member made of a material which has flexibility but low extensibility so that it can counter the reaction force of said airbag when it expands.

6. A knee protecting airbag device as set forth in claim 5, wherein said sheet member is formed into a rectangular plate shape and arranged such that its two front and rear edges are connected to the vicinities of the front and rear edges of a projection opening of said airbag in said column cover.

* * * * *